(12) United States Patent
Tarta et al.

(10) Patent No.: US 9,569,274 B2
(45) Date of Patent: Feb. 14, 2017

(54) DISTRIBUTED APPLICATION OPTIMIZATION USING SERVICE GROUPS

(71) Applicant: Microsoft Technology Licensing, LLC, Redmond, WA (US)

(72) Inventors: Mihail G. Tarta, Sammamish, WA (US); Gopal Krishna R. Kakivaya, Sammamish, WA (US); Anurag Gupta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 13/653,255

(22) Filed: Oct. 16, 2012

(65) Prior Publication Data

US 2014/0108483 A1 Apr. 17, 2014

(51) Int. Cl.
*G06F 15/16* (2006.01)
*G06F 9/50* (2006.01)

(52) U.S. Cl.
CPC .................. *G06F 9/5072* (2013.01)

(58) Field of Classification Search
CPC ...................................... H04L 67/00
USPC ................................ 709/201, 203
See application file for complete search history.

(56) References Cited

U.S. PATENT DOCUMENTS

| | | | |
|---|---|---|---|
| 5,790,863 A | 8/1998 | Simonyi | |
| 6,442,165 B1 | 8/2002 | Sitaraman et al. | |
| 6,993,734 B2 | 1/2006 | Baumgartner et al. | |
| 6,993,743 B2 | 1/2006 | Crupi et al. | |
| 7,051,098 B2 * | 5/2006 | Masters | G06F 9/06 709/223 |
| 7,103,874 B2 | 9/2006 | McCollum et al. | |
| 7,178,129 B2 | 2/2007 | Katz | |

(Continued)

FOREIGN PATENT DOCUMENTS

| | | |
|---|---|---|
| CN | 101763266 | 6/2010 |
| WO | 2006108290 | 10/2006 |

OTHER PUBLICATIONS

Homer, Alex, "Components and Web Application Architecture", Published on: Apr. 3, 2008, Available at: http://technet.microsoft.com/en-us/library/bb727121.aspx.

(Continued)

*Primary Examiner* — Wing F Chan
*Assistant Examiner* — Andrew Woo
(74) *Attorney, Agent, or Firm* — Ben Tabor; Kate Drakos; Micky Minhas

(57) ABSTRACT

Embodiments are directed to managing multiple different types of applications using service groups. In one scenario, a computer system receives an indication of one or more application dependencies and characteristics that are to be implemented when an application is provisioned on a distributed host computer system. The computer system creates an application manifest that declaratively defines application dependencies and characteristics for various different service groups. Each service group includes applications that match the declaratively defined application dependencies and characteristics. The computer system also sends the manifest to the distributed host computer system which loads those applications that fit the manifest criteria onto available nodes of the distributed host computer system according to the service groups specified in the manifest.

17 Claims, 4 Drawing Sheets

(56) References Cited

U.S. PATENT DOCUMENTS

| | | | |
|---|---|---|---|
| 7,181,743 B2* | 2/2007 | Werme | G06F 9/06 340/7.2 |
| 7,188,155 B2 | 3/2007 | Flurry | |
| 7,392,314 B2 | 6/2008 | Betzler et al. | |
| 7,412,518 B1* | 8/2008 | Duigou et al. | 709/227 |
| 7,526,734 B2 | 4/2009 | Vasilev et al. | |
| 7,774,697 B2 | 8/2010 | Olander et al. | |
| 7,774,745 B2 | 8/2010 | Fildebrandt et al. | |
| 7,890,870 B1 | 2/2011 | Metters et al. | |
| 7,917,888 B2 | 3/2011 | Chong et al. | |
| 7,996,814 B1 | 8/2011 | Quereshi et al. | |
| 8,046,737 B2 | 10/2011 | Wittenberg et al. | |
| 8,060,586 B2 | 11/2011 | Yang et al. | |
| 8,156,469 B2 | 4/2012 | Seeger et al. | |
| 8,285,676 B2 | 10/2012 | Bahl et al. | |
| 8,316,344 B2 | 11/2012 | Kaetker et al. | |
| 8,341,593 B2 | 12/2012 | Fildebrandt et al. | |
| 8,438,542 B2 | 5/2013 | Nandan et al. | |
| 8,539,507 B2 | 9/2013 | Aveyard et al. | |
| 8,561,048 B2 | 10/2013 | Seeger et al. | |
| 8,719,766 B1 | 5/2014 | Walker et al. | |
| 8,776,047 B2 | 7/2014 | Wookey | |
| 8,893,076 B2 | 11/2014 | Softky | |
| 9,038,037 B1 | 5/2015 | Biggerstaff | |
| 9,128,803 B2 | 9/2015 | Shukla | |
| 2002/0091990 A1 | 7/2002 | Little et al. | |
| 2002/0144233 A1 | 10/2002 | Chong et al. | |
| 2003/0105887 A1 | 6/2003 | Cox et al. | |
| 2003/0120711 A1 | 6/2003 | Katz | |
| 2004/0117759 A1 | 6/2004 | Rippert, Jr. et al. | |
| 2004/0176988 A1 | 9/2004 | Boughannam | |
| 2004/0177335 A1 | 9/2004 | Beisiegel et al. | |
| 2004/0187140 A1 | 9/2004 | Aigner et al. | |
| 2004/0226029 A1 | 11/2004 | Gelme | |
| 2005/0091227 A1 | 4/2005 | McCollum et al. | |
| 2005/0144226 A1 | 6/2005 | Purewal | |
| 2005/0160398 A1 | 7/2005 | Bjornson et al. | |
| 2005/0166180 A1 | 7/2005 | Lemon et al. | |
| 2005/0235248 A1 | 10/2005 | Victoria et al. | |
| 2006/0074730 A1 | 4/2006 | Shukla et al. | |
| 2006/0206599 A1 | 9/2006 | Milligan | |
| 2006/0236302 A1 | 10/2006 | Bateman et al. | |
| 2006/0248121 A1 | 11/2006 | Cacenco et al. | |
| 2006/0248506 A1 | 11/2006 | Luo et al. | |
| 2007/0033569 A1 | 2/2007 | Davidson et al. | |
| 2007/0094364 A1 | 4/2007 | Oberhauser | |
| 2007/0150852 A1 | 6/2007 | Balderas et al. | |
| 2007/0157179 A1 | 7/2007 | Seeger et al. | |
| 2007/0157191 A1 | 7/2007 | Seeger et al. | |
| 2007/0233820 A1 | 10/2007 | Schneider | |
| 2008/0195441 A1 | 8/2008 | Hacigumus | |
| 2008/0244507 A1 | 10/2008 | Hodson et al. | |
| 2009/0013310 A1 | 1/2009 | Arner et al. | |
| 2009/0083732 A1 | 3/2009 | Shen et al. | |
| 2009/0106011 A1 | 4/2009 | Chen et al. | |
| 2009/0106350 A1 | 4/2009 | Chen et al. | |
| 2009/0157872 A1 | 6/2009 | Pinkston et al. | |
| 2009/0158241 A1 | 6/2009 | Nandan et al. | |
| 2009/0274299 A1 | 11/2009 | Caskey et al. | |
| 2009/0319951 A1 | 12/2009 | Benedetti et al. | |
| 2009/0327482 A1 | 12/2009 | Malhotra et al. | |
| 2010/0011338 A1 | 1/2010 | Lewis | |
| 2010/0088662 A1 | 4/2010 | Tung et al. | |
| 2010/0093443 A1 | 4/2010 | Yan et al. | |
| 2010/0100525 A1 | 4/2010 | Huang | |
| 2010/0107136 A1 | 4/2010 | Fildebrandt et al. | |
| 2010/0195503 A1* | 8/2010 | Raleigh | 370/235 |
| 2010/0198948 A1 | 8/2010 | Yang et al. | |
| 2011/0088011 A1 | 4/2011 | Ouali | |
| 2011/0119649 A1 | 5/2011 | Kand et al. | |
| 2011/0119651 A1 | 5/2011 | Utschig-Utschig et al. | |
| 2011/0283257 A1 | 11/2011 | Charisius et al. | |
| 2012/0159424 A1* | 6/2012 | Shukla et al. | 717/103 |
| 2012/0159425 A1 | 6/2012 | Shukla et al. | |
| 2012/0174058 A1* | 7/2012 | Winkler et al. | 717/105 |
| 2014/0082131 A1* | 3/2014 | Jagtap | 709/217 |

OTHER PUBLICATIONS

International Search Report & Written Opinion for PCT Patent Application No. PCT/US2013/065149, Mailed Date: Jan. 30, 2014, Filed Date: Oct. 16, 2013, 8 pages.

Third Office Action and Search Report Issued in Chinese Patent Application No. 201110447787.2, Mailed Date: Mar. 24, 2015, 20 Pages.

Santos, Pablo, "Distributed Software Development Explained", Jul. 3, 2008, 9 pages.

"Integrated Development Environment", Available at least as early as Oct. 15, 2010, 4 pages.

Gamma, Erich, et al., "Design Patterns: Elements of Reusable Object-Oriented Software", Oct. 1994, Addison-Wesley Publishing Company, Inc., 5 pages.

Forsberg, Christian, "Managing Remote Devices with Odyssey Athena and XML Web Service", Aug. 2005, Available at <<http://msdn.microsoft.com/en-us/library/ms839347.aspx>>.

Verheecke, Bart, et al., "AOP for Dynamic Configuration and Management of Web Services", 2003, (The month of Publication is irrelevant since the year of Publication is clearly prior to the filing of the Application) Available at: http://ssel.vub.ac.be/wsml/papers/Verheecke_Cibran_ICWS03.pdf.

Amirian, Pouria, et al., "A Hybrid Architecture for Implementing Efficient Geospatial Integrating .NET Remoting and Web Services Technologies", 2003, (The month of Publication is irrelevant since the year of Publication is clearly prior to the filing of the Application) Available at <<http://serv2.ist.psu.edu:8080/viewdoc/summary;jsessionid=10EC96C9E1E428C1E942CDD2E791F4C?doi=10.1.1.111.4103>>.

U.S. Appl. No. 12/980,801, May 9, 2013, Office Action.
U.S. Appl. No. 12/980,801m Nov. 18, 2013, Office Action.
U.S. Appl. No. 12/980,801, Mar. 21, 2014, Office Action.
U.S. Appl. No. 12/980,801, Sep. 23, 2014, Office Action.
U.S. Appl. No. 12/364,970, Mar. 15, 2011, Office Action.
U.S. Appl. No. 12/364,970, Jul. 15, 2011, Notice of Allowance.

Hannemann, et al., "Design pattern implementation in Java and aspectJ" [Online], SIGPLAN Not. 37, Nov. 11, 2002, pp. 161-173. Available at <<http://doi.acm.org/10.1145/583854.582436>>.

Dong, et al., "Visualizing Design patterns in Their Applications and Compositions" [Online], IEEE Transactions on Software Engineering, vol. 33, No. 7, Jul. 2007, pp. 433-453. Available at <<http://ieeexplore.ieee.org/stamp/stamp.jsp?tp=&arnumber=4227827&isnumber=4227824>>.

Castagna, et al., "A theory of contracts for Web services" [Online], ACM Trans. Program Lang. Syst. 31, 5, Article 19, Jul. 2009, 61 pages. Available at <<http://doi.acm.org/10.1145/153891731538920>>.

Ngu, et al., "Semantic-Based Mashup of Composite Applications" [Online], IEEE Transactions on Services Computing, vol. 3, No. 1, Jan.-Mar. 2010, pp. 2-15. Available at <<http://ieeexplore.ieee.org/stamp/stamp.jsp?tp=&arnumber=5432153&isnumber=5440876>>.

Dong, et al., "Commutability of Design Pattern Instantiation and Integration" [Online], First Joint IEEE/IFIP Symposium on Theoretical Aspects of Software Engineering, Jun. 2007, pp. 283-292. Available at <<http:/ ieeexplore.ieee.org/stamp/stamp.jsp?tp=&arnumber=4239972&isnumber>>.

Notice of Allowance dated Feb. 13, 2015 cited in U.S. Appl. No. 12/980,801.

First Office Action and Search Report Received for China Patent Application No. 201110447787.2, Mailed Date: Jan. 10, 2014, 18 Pages.

Second Office Action Received for China Patent Application No. 201110447787.2, Mailed Date: Sep. 23, 2014, 16 Pages.

Office Action dated Jun. 3, 2015 cited in U.S. Appl. No. 12/980,801.

Fraternali, et al., "Engineering rich Internet applications with a model-driven approach", Apr. 2010, ACM Trans. Web 4, 2, Article 7, 47 pages. Available at <<http://dx.doi.org/10.1145/1734200.1734204>>.

(56) References Cited

OTHER PUBLICATIONS

Chidisuic, et al., "CD++ Builder: An eclipse-based IDE for DEVS modeling", In Proceedings of the 2007 spring simulation multiconference—vol. 2, Society for Computer Simulation International, San Diego, CA, USA, pp. 235-240. Available at <<http://delivery.acm.org/10.1145/>>.

Greenfield, "Software Factories: Assembling Applications with Patterns, Models, Frameworks, and Tools", Nov. 2004, 9 pages. Available at <<http://uosis.mif.vu.lt/~donatas/Vadovavimas/Temos/MDD/SoftwareFactories/Greenfield2004%20-%20Software%20Factories%20-%20Assembling%20Applications.pdf>>.

Notice of Allowance dated Nov. 6, 2015 cited in U.S. Appl. No. 12/980,801.

"RHEL 6 Cluster Admin—Appendix C. HA Resource Behavior", Jun. 2011, 2 pages. Available at <<https://web.archive.org/web/20110607093823/http://linuxtopia.org/online_books/rhel6/rhel_6_cluster_admin/rhel_6_cluster_ap-ha-resource=behavior-CA.html>>.

Office Action Issued in European Patent Application No. 13786780.0, Mailed Date: Jul. 7, 2016, 6 Pages.

\* cited by examiner

DISTRIBUTED APPLICATION OPTIMIZATION USING SERVICE GROUPS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are hosted on large, distributed computing systems such as cloud computing systems. These applications are provided to large numbers of users, spread over wide geographic areas. The applications (or instances thereof) may be run on various different physical and/or virtual computer systems located in geographically-dispersed areas. Managing these distributed applications can require a substantial effort.

BRIEF SUMMARY

Embodiments described herein are directed to managing multiple different types of applications using service groups. In one embodiment, a computer system receives an indication of one or more application dependencies and characteristics that are to be implemented when an application is provisioned on a distributed host computer system. The computer system creates an application manifest that declaratively defines application dependencies and characteristics for various different service groups. Each service group includes applications that match the declaratively defined application dependencies and characteristics. The computer system also sends the manifest to the distributed host computer system which loads those applications that fit the manifest criteria onto available nodes of the distributed host computer system according to the service groups specified in the manifest.

In another embodiment, a computer system receives an application manifest that declaratively defines application dependencies and characteristics for different service groups, so that each service group includes applications that match the declaratively defined application dependencies and characteristics. The computer system determines which applications are to be loaded in a specified service group and loads those applications that fit the manifest criteria for the specified service group on a single node of the distributed computer system according to the manifest, so that those applications that fit the manifest criteria for the specified service group are co-located. Co-location allows applications to failover and migrate together.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
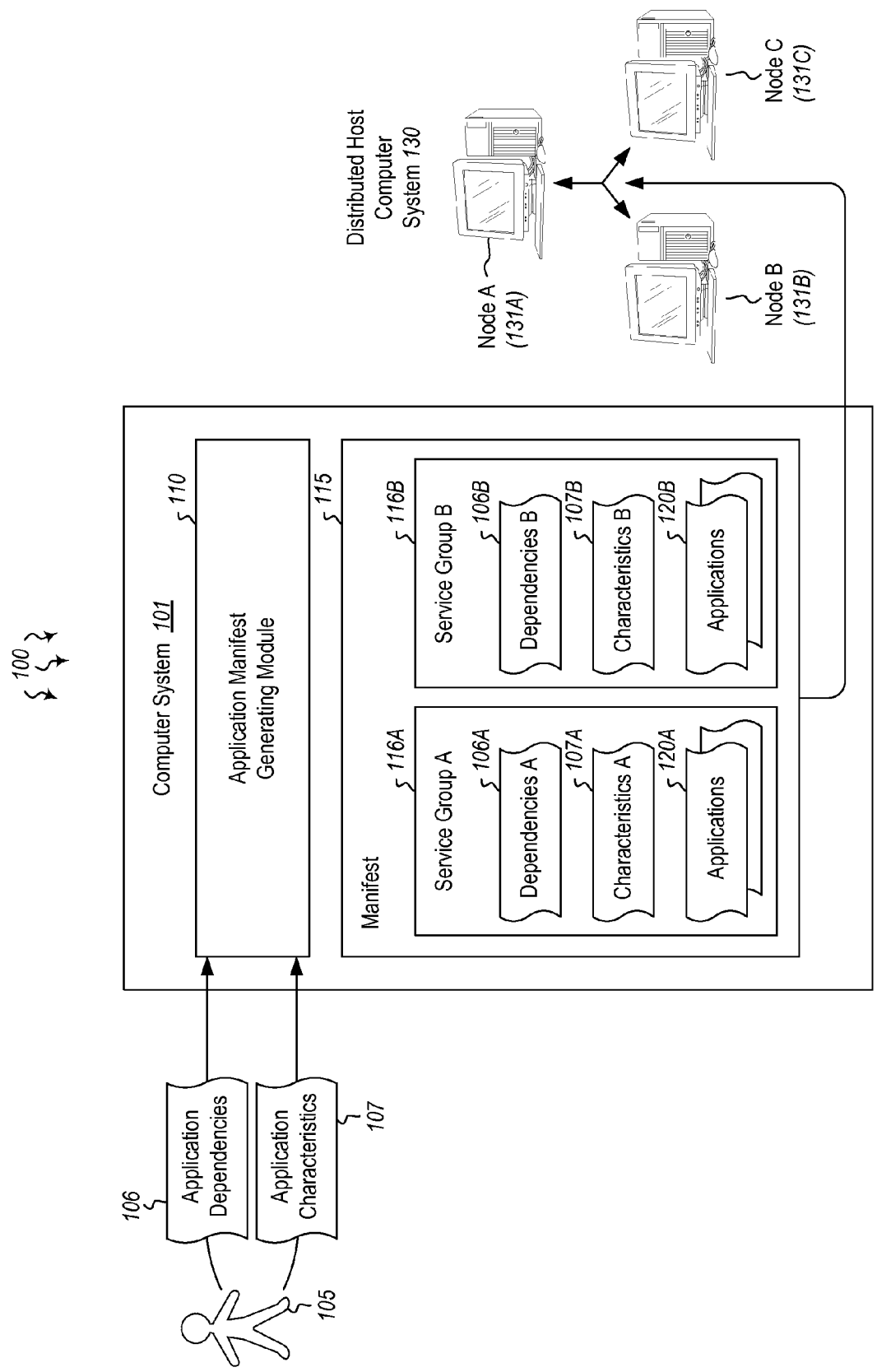
FIG. 1 illustrates a computer architecture in which embodiments described herein may operate including managing multiple different types of applications using service groups.

Embodiments described herein are directed to managing multiple different types of applications using service groups. In one embodiment, a computer system receives an indication of one or more application dependencies and characteristics that are to be implemented when an application is provisioned on a distributed host computer system. The computer system creates an application manifest that declaratively defines application dependencies and characteristics for various different service groups. Each service group includes applications that match the declaratively defined application dependencies and characteristics. The computer system also sends the manifest to the distributed host computer system which loads those applications that fit the manifest criteria onto available nodes of the distributed host computer system according to the service groups specified in the manifest.

In another embodiment, a computer system receives an application manifest that declaratively defines application dependencies and characteristics for different service groups, so that each service group includes applications that match the declaratively defined application dependencies and characteristics. The computer system determines which applications are to be loaded in a specified service group and loads those applications that fit the manifest criteria for the specified service group on a single node of the distributed computer system according to the manifest, so that those applications that fit the manifest criteria for the specified service group are co-located. Co-location allows applications to failover and migrate together.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. For instance, an application manifest generating module 110 may be used to generate an application manifest from application dependencies 106 and characteristics 107 provided by a user 105. The application manifest 115 may include descriptions or declarative definitions of applications that are to be included in a given service group. For instance, if an application needs certain computing power guarantees, those needs can be indicated in the application characteristics 107. If an application is dependent on another application or service, those dependencies can be indicated in the application dependencies 106. Many other dependencies and/or characteristics may be indicated by the user 105.

Service groups, as referred to herein, are groups of applications or services that meet one or more criteria including dependencies 106 and/or characteristics 107. Service groups may be implemented to provide computing performance and scale capabilities to hosted applications or services. Services within a service group may be unaware that they (or other services) are part of a service group (or not part of a service group). As such, a programming model or service model for a service will be the same whether it is part of a service group or not. This allows composition of related services (e.g. related in application logic), as well as unrelated services in the same service group. Service groups may accommodate grouping of applications or services written in native code, managed code or both native and managed code services. The service host of the service group (e.g. distributed host computer system 130) can be native as well as managed.

When service-group-specific features and capabilities are accessed by services within the service group (e.g. applications 120A within service group 116A), the service model is explicit. In such cases, functionality is available only to services in that service group (and not regular services) through explicit APIs and constructs. The application developer (e.g. user 105) may be aware of the service groupings. Services in the service group can be of the same or different service types. It should be noted that although the terms "application" and "service" both refer to portions of executable software code, an application may include one or more service groups and one or more services. A service model may be used to express the model of grouped services, and may further be used to manage the service groups.

Services that are part of the same service group may be grouped together on the same physical hardware (e.g. on node A (131A) of the distributed host computer system 130. Such services are said to be "co-located". Co-located services are load balanced together, and also failover together if there is a hardware failure. Thus, if a particular node (e.g. 131B or 131C) becomes available to handle some of node 131A's load for example, co-located services running on node 131A will be moved together from 131A to 131B or 131C. Similarly, if two co-located services are running on node 131A and it fails (for whatever reason), the two co-located services may be migrated to node 131B or 131C together. This failover or load balancing may occur automatically, as managed by the distributed host computer system. Although the above example describes co-locating two services, it should be understood that substantially any number of services or applications may be co-located. Load balancing properties (placement constraints, load utilization reporting, etc.) may be applied at the service group level. Each service member in the service group will report its load metrics, and the service group will perform appropriate aggregation.

Service groups can run in any node of the distributed host computer system 130. A service group with a different instance can be activated in the same or a different host node. Different service groups can be activated in the same host. Services in the service group can provide their own binaries. Both service groups and services within the service group are named entities. Using naming client APIs, a client can resolve the service group name, and the name of any service within that service group. Moreover, a service within the service group can resolve and obtain access (via a service endpoint or interface pointer) to any other service within that same service group for efficient inter-service communication. The interface pointer access can also be used for efficient inter-service communication within the same service host process. These concepts will be explained further below with regard to methods 200 and 300 of FIGS. 2 and 3, respectively.

Figure 2:
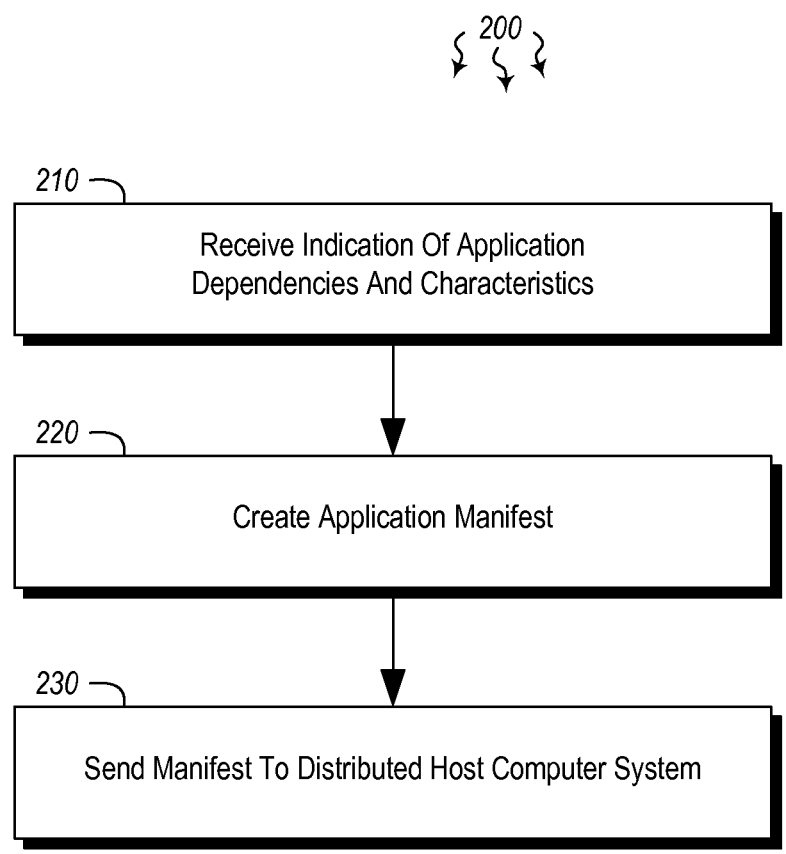
FIG. 2 illustrates a flowchart of an example method for managing multiple different types of applications using service groups.
Figure 3:
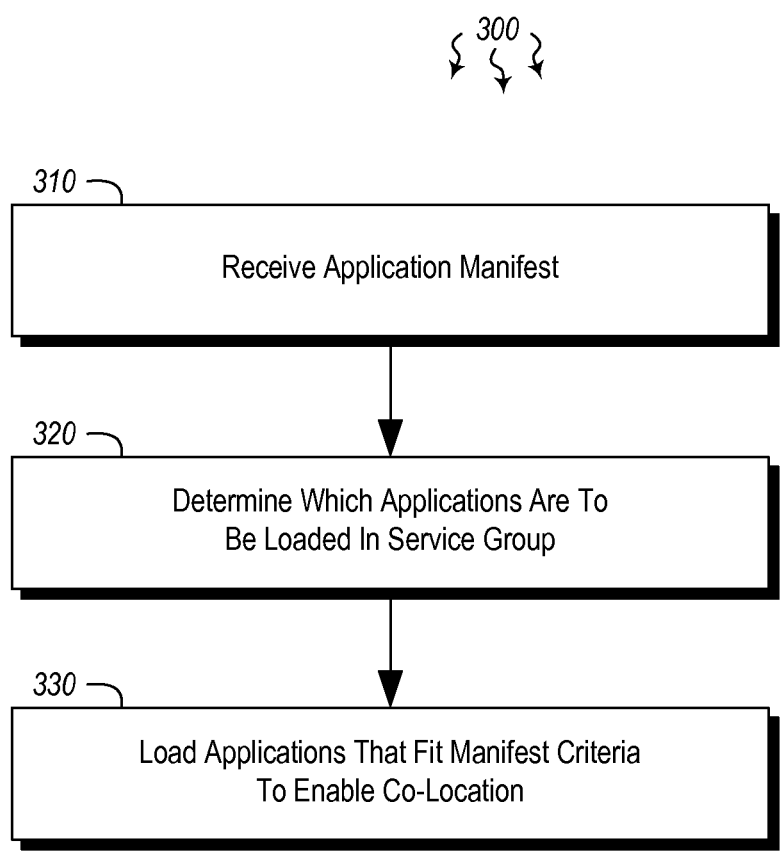
FIG. 3 illustrates a flowchart of an alternative example method for managing multiple different types of applications using service groups.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for managing multiple different types of applications using service groups. The method 200 will now be described with frequent reference to the components and data of environment 100.

Method 200 includes an act of receiving an indication of one or more application dependencies and characteristics that are to be implemented when an application is provisioned on a distributed host computer system (act 210). For example, application manifest generating module 110 may receive application dependencies 106 and/or application characteristics 107 that are to be implemented when an application (e.g. one of applications 120A) is provisioned on distributed host computer system 130. The distributed host computer system 130 may be any type of distributed or cloud computing system and may include substantially any number of computing nodes, each node having a variable number of processors, threads, virtual computer systems or other hardware or logical components.

Method 200 includes an act of creating an application manifest that declaratively defines application dependencies and characteristics for each of a plurality of different service groups, such that each service group includes applications that match the declaratively defined application dependencies and characteristics (act 220). The applications of a service group (e.g. applications 120A of service group 116A) include those applications or services that meet the dependencies and characteristics for that service group. Thus, for service group 116B, applications 120B would include those applications that met the dependencies 106B and characteristics 107B described in the manifest 115. The manifest may include dependencies and characteristics for substantially any number of different service groups.

Examples of application characteristics may include computational power specifications for an application. An administrator or application developer can group applications together into a service group based on the application's need (high or low) for processing power. Application characteristics may also include the nature of the clients accessing the application. For instance, if one application is accessed by a very large number of people, it may be grouped in service group 116A, while applications that have a relatively low access rate may be grouped in service group 116B. Similarly, if an application needs to scale at a certain time (e.g. a shopping cart application near the Christmas holiday), it may be grouped with other such applications. Thus, an administrator, application developer, IT professional or other user may group applications using application characteristics. Moreover, if one application or service is dependent on another for input (or for any other reason), the user 105 may indicate that the application is dependent on the other, and that for one to run, both need to be running. In this manner, a user may provide substantially any type of application characteristic or dependency on which a service group may be based. The characteristics and dependencies may also be time based, such that certain characteristics or dependencies only apply on weekdays or weekends, or during certain hours of the day.

Figure 4:
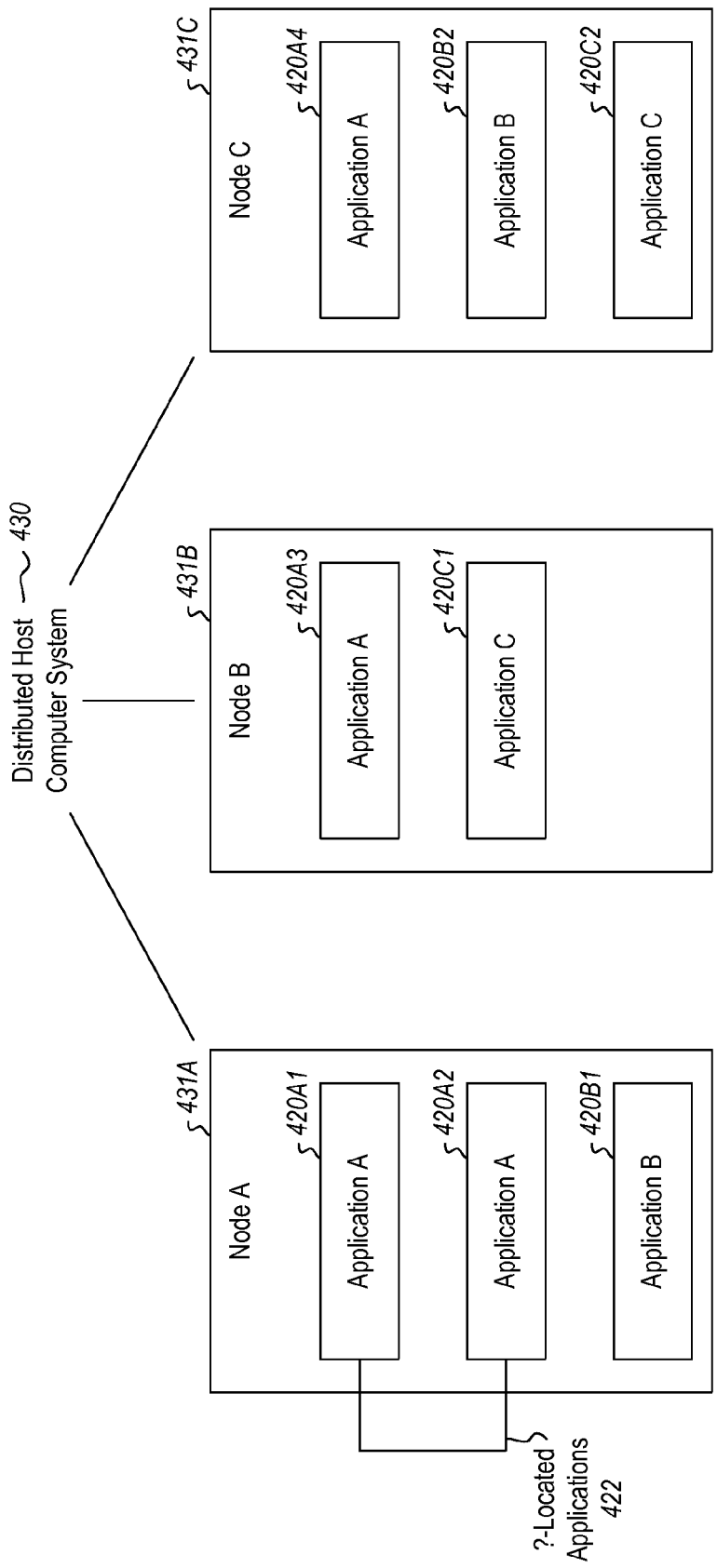
FIG. 4 illustrates an embodiment in which a distributed host computer system hosts multiple applications on different computing nodes.

In some embodiments, one of the application dependencies declaratively defined in the application manifest 115 may include an estimated workload for the application (e.g. an indication of the estimated amount of computing resources the application will consume). Another of the application dependencies declaratively defined in the application manifest may include desired (or required) hardware characteristics for hardware that runs the application(s). The service groups may include different application types including applications written in managed code (e.g. C#), or applications written in native code (e.g. C++), or both managed and native applications. The manifest 115 indicates whether the application is managed or native. Similarly, service groups may include both related and unrelated applications. Thus, as shown in FIG. 4, a single node (e.g. 431C) may include application A (instance 420A4), application B (instance 420B1) and application C (instance 420C2), each of which may be related or unrelated to the other. Application developers do not need to indicate or even think about which service group they are part of, as service groups can accommodate all types of applications.

The service groups allow the applications to be scaled over multiple different nodes in the distributed host computer system. For instance, as shown in FIG. 4, distributed host computer system 430 may include three nodes (more or fewer are possible), nodes 431A, 431B and 431C. Each node may run multiple applications or application instances. For example, node 431A is shown as running two applications (two instances of application A (420A1 and 420A2), and application B (instance 420B1)). Node 431B is shown as running instance 420A3 of application A and instance 420C1 of application C, while node 431C is shown as running instance 420A4 of application A, instance 420B2 of application B and instance 420C2 of application C. Accordingly, each node in the cluster 430 may run different instances of related or unrelated, managed or native applications. As will be explained below, applications within a particular service group may be co-located, as with application instances 420A1 and 420A2. These application instances will fail over and load balance together, and will be maintained on the same physical cluster node.

The application manifest 115 may also specify one or more runtime characteristics for applications that are part of a specified service group. The runtime characteristics may indicate how many instances of each application are to be started when the application is initialized. Moreover, the runtime characteristics may indicate the name of each application that is to be started. Other runtime characteristics may also be specified in the application manifest.

Method 200 next includes an act of sending the manifest to the distributed host computer system which loads those applications that fit the manifest criteria on one or more available nodes of the distributed host computer system according to the service groups specified in the manifest (act 230). For example, application manifest 115 may be sent to distributed host computer system 130 by computer system 101. The manifest indicates which applications are to be loaded into which service groups, and for those application instances that are to be co-located, the host system loads the instances on the same cluster node (e.g. 131C). Once the applications are initially loaded, the applications' lifecycles may be managed by the user 105. Thus, the applications may be upgraded, removed, taken down, modified or otherwise managed on the host system 130. Managing the applications may also include making a determination as to which nodes currently have available computing resources. Then, once those nodes have been located, the managing may include starting the applications on those nodes that are determined to have available processing resources. Administrators may similarly choose nodes based on other factors such as a history of very high uptime, an ability to handle large numbers network requests, a secure status indicating that the node is physically secured from attackers, or any number of other factors. Thus, in this manner, administrators may manage both the service groups and the lifecycle of applications within the groups.

FIG. 3 illustrates a flowchart of a an alternative method 300 for managing multiple different types of applications using service groups. The method 300 will now be described with frequent reference to the components and data of environment 100.

Method 300 includes an act of receiving an application manifest that declaratively defines application dependencies and characteristics for each of a plurality of different service groups, such that each service group includes applications that match the declaratively defined application dependencies and characteristics (act 310). For example, application manifest generating module 110 may receive application dependencies 106 and application characteristics 107 from user 105. Computer system 101 may determine which applications are to be loaded in a specified service group based on the manifest (act 320). Then, those applications that fit the manifest criteria for the specified service group are loaded on a single node of the distributed computer system according to the manifest 115, such that those applications that fit the manifest criteria for the specified service group are co-located (act 330). Accordingly, in one example, applications 120A of service group 116A are those applications that met dependencies 106A and characteristics 107A.

Applications that are dependent on each other may be co-located (e.g. co-located application instances 422 (420A1 and 420A2) of FIG. 4). These co-located application instances may fail over and be load balanced together. For instance, the distributed host computer system 430 may determine that an application instance (e.g. 420A1) in a specified service group (e.g. service group 116A) has failed on node 431A of the distributed host computer system. After this determination, both the application instance that failed (420A1) and those application instances that are co-located in the service group are migrated to a different node (e.g. 431B) on the distributed host computer system. This migration may occur automatically upon determining that a hardware or software failure has occurred and that at least one of a group of co-located application instances has gone down.

As mentioned above, service groups may include both related and unrelated applications, as well as managed or native applications. Service groups may also include stateless applications (applications that do not maintain state) and/or stateful applications (applications that do maintain state). When stateless applications are grouped in a service group, the application can simply be restarted on a new node without worrying about what the state was when the application originally went own. When stateful applications are grouped in a service group and an application goes down, the state is stored and migrated to the new node along with the application. When stateful applications are run, the application state may be replicated on multiple different nodes of the distributed host computer system 430 nodes. Applications or services that are part of the same service group may experience atomic system state transitions that implement all-or-nothing semantics amongst the service replicas or instances that part of the service group. Stateful services that are part of the same service group may share a common replicator. This enables amortization of the cost of replicator resources.

In some cases, applications in the same service group may communicate with each other using local name resolution. For example, if applications A and B of FIG. 4 are in same service group, application A communicates with B using local name resolution to determine which physical node of the distributed host computer system application B is located on. Applications A and B may then work together, for example, to commit any application changes that are made. These changes may be made in a manner which provides the traditional ACID guarantees. As such, atomic groups provide the atomicity and durability guarantees specified by ACID. In other embodiments, administrators or other users (e.g. 105) may use service groups to build application logic workflows. These workflows may specify which tasks are to be performed by which service groups, and in which order. As such, service groups may be implemented in conjunction with each other to perform a specified task or series of tasks in an workflow. Accordingly, methods, systems and computer program products are provided which manage multiple different types of applications using service groups.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system, comprising:
one or more processors;
system memory; and
one or more computer-readable storage media having stored thereon computer-executable instructions that are executable by the one or more processors to configure the computer system to manage applications using service groups, including computer-executable instructions that are executable to configure the computer system to perform at least the following:
receive an indication of one or more application dependencies and a plurality of application characteristics to be implemented on a distributed host computer system, the one or more application dependencies describing at least a required computing environment, and the plurality of application characteristics defining a plurality of desired runtime behaviors;
based at least on receiving the indication of the one or more application dependencies and the plurality of application characteristics, identify, at the one or more processors, a plurality of applications, from a set of available applications, that are executable within the required computing environment and that each exhibit at least one of the plurality of desired runtime behaviors, wherein the one or more application dependencies include an application dependency defining that at least a first application of the plurality of applications is dependent on a second application of the plurality of applications such that the second application needs to be running for the first application to run;
create, at the one or more processors, a manifest that defines a plurality of service groups for implementing the plurality of application characteristics on the required computing environment and within the distributed host computer system, the plurality of service groups including a first service group that executes a first subset of the plurality of applications on the required computing environment within the distributed host computer system to exhibit a first subset of the plurality of desired runtime behaviors, and a second service group that executes a second different subset of the plurality of applications on the required computing environment within the distributed host computer system to exhibit a second different subset of the plurality of desired runtime behaviors; and
send the manifest to the distributed host computer system, for loading the first subset of the plurality of applications on one or more first available nodes of the distributed host computer system as part of the first service group, and for loading the second subset of the plurality of applications on one or more second available nodes of the distributed host computer system as part of the second service group.

2. The computer system of claim 1, the manifest being configured to cause the distributed host computer system to manage a lifecycle of the plurality of applications at the distributed host computer system.

3. The computer system of claim 1, wherein the plurality of applications comprise a plurality of different application types.

4. The computer system of claim 1, wherein each service group allows applications to be scaled over a plurality of nodes in the distributed host computer system.

5. The computer system of claim 1, wherein the plurality of application characteristics include computational power specifications for at least one of the plurality of applications.

6. The computer system of claim 1, wherein the plurality of applications comprise both related and unrelated applications.

7. The computer system of claim 1, wherein at least one of the plurality of application characteristics specifies a nature of clients accessing at least one of the plurality of applications.

8. The computer system of claim 1, wherein at least one of the plurality of application characteristics specifies how many instances of at least one of the plurality of applications are to be started.

9. The computer system of claim 1, wherein at least one of the plurality of application characteristics specifies how at least one of the plurality of applications is to be scaled.

10. The computer system of claim 1, wherein at least one of the one or more application dependencies specifies an estimated workload for at least one of the plurality of applications.

11. The computer system of claim 1, wherein at least one of the one or more application dependencies specifies one or more hardware characteristics for hardware that runs at least one of the plurality of applications.

12. A method, implemented at a computer system that includes one or more processors, for managing applications using service groups, the method comprising:
    identifying one or more application dependencies and a plurality of application characteristics to be implemented on a distributed host computer system, the one or more application dependencies describing at least a required computing environment, and the plurality of application characteristics defining a plurality of desired runtime behaviors;
    based at least on identifying the one or more application dependencies and the plurality of application characteristics, identifying, at the one or more processors, a plurality of applications that that are executable within the required computing environment and that each exhibit at least one of the plurality of desired runtime behaviors, wherein the one or more application dependencies include an application dependency defining that at least a first application of the plurality of applications is dependent on a second application of the plurality of applications such that the second application needs to be running for the first application to run;
    generating, at the one or more processors, a manifest that defines a plurality of service groups for implementing the plurality of application characteristics on the required computing environment and within the distributed host computer system, the plurality of service groups including a first service group that executes a first subset of the plurality of applications on the required computing environment within the distributed host computer system to exhibit a first subset of the plurality of desired runtime behaviors, and a second service group that executes a second different subset of the plurality of applications on the required computing environment within the distributed host computer system to exhibit a second different subset of the plurality of desired runtime behaviors; and
    sending the manifest to the distributed host computer system, for loading the first subset of the plurality of applications on one or more first available nodes of the distributed host computer system as part of the first service group, and for loading the second subset of the plurality of applications on one or more second available nodes of the distributed host computer system as part of the second service group.

13. The method claim 12, wherein at least one of the plurality of application characteristics specifies a nature of clients accessing at least one of the plurality of applications.

14. The method claim 12, wherein at least one of the plurality of application characteristics specifies how many instances of at least one of the plurality of applications are to be started.

15. The method claim 12, wherein at least one of the plurality of application characteristics specifies how at least one of the plurality of applications is to be scaled.

16. The method claim 12, wherein the plurality of applications comprise both related and unrelated applications.

17. A computer program product comprising one or more hardware storage devices having stored thereon computer-executable instructions that are executable by one or more processors to configure a computer system to manage applications using service groups, including computer-executable instructions that are executable to configure the computer system to perform at least the following:
    receive one or more application dependencies and plurality of application characteristics to be implemented on a distributed host computer system, the one or more application dependencies describing at least a required computing environment, and the plurality of application characteristics defining a plurality of desired runtime behaviors;
    based at least on receiving the one or more application dependencies and the plurality of application characteristics, determine, at the one or more processors, a plurality of applications, from a set of available applications, that are executable within the required computing environment and that each exhibit at least one of the plurality of desired runtime behaviors, wherein the one or more application dependencies include an application dependency defining that at least a first application of the plurality of applications is dependent on a second application of the plurality of applications such that the second application needs to be running for the first application to run;
    automatically generate, at the one or more processors, a manifest that defines a plurality of service groups for implementing the plurality of application characteristics on the required computing environment and within the distributed host computer system, the plurality of service groups including a first service group that executes a first subset of the plurality of applications on the required computing environment within the distributed host computer system to exhibit a first subset of the plurality of desired runtime behaviors, and a second service group that executes a second different subset of the plurality of applications on the required computing environment within the distributed host computer system to exhibit a second different subset of the plurality of desired runtime behaviors; and
    send the manifest to the distributed host computer system, for loading the first subset of the plurality of applications on one or more first available nodes of the distributed host computer system as part of the first service group, and for loading the second subset of the plurality of applications on one or more second available nodes of the distributed host computer system as part of the second service group.

* * * * *